(12) United States Patent
Nishikido

(10) Patent No.: US 12,397,236 B2
(45) Date of Patent: Aug. 26, 2025

(54) INFORMATION PROCESSING APPARATUS AND INFORMATION DISPLAY METHOD

(71) Applicant: Sony Interactive Entertainment Inc., Tokyo (JP)

(72) Inventor: Masanao Nishikido, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 17 days.

(21) Appl. No.: 17/873,783

(22) Filed: Jul. 26, 2022

(65) Prior Publication Data
US 2023/0075618 A1    Mar. 9, 2023

(30) Foreign Application Priority Data
Sep. 8, 2021   (JP) ................................. 2021-146393

(51) Int. Cl.
  *A63F 13/00*   (2014.01)
  *A63F 13/533*  (2014.01)
  *A63F 13/69*   (2014.01)

(52) U.S. Cl.
  CPC ............ *A63F 13/69* (2014.09); *A63F 13/533* (2014.09)

(58) Field of Classification Search
  CPC ...... A63F 13/69; A63F 13/79; A63F 13/3262; A63F 13/3267
  See application file for complete search history.

(56) References Cited

U.S. PATENT DOCUMENTS

| 9,289,683 | B2 * | 3/2016 | Walling | ................ | A63F 13/46 |
| 2011/0124399 | A1 * | 5/2011 | Dutilly | .................... | A63F 13/69 |
| | | | | | 463/25 |
| 2016/0044226 | A1 * | 2/2016 | Williams | ........... | H04N 21/4788 |
| | | | | | 348/211.3 |

FOREIGN PATENT DOCUMENTS

| EP | 4019102 A1 | 6/2022 |
| JP | 2016097089 A | 5/2016 |
| JP | 2021062173 A | 4/2021 |

OTHER PUBLICATIONS

NBA 2k20 https://youtu.be/aykvf5SFCRo?si=fTIJe0PJm4stf1qV (Year: 2020).*

\* cited by examiner

*Primary Examiner* — David L Lewis
*Assistant Examiner* — Eric M Thomas
(74) *Attorney, Agent, or Firm* — Kilpatrick Townsend & Stockton LLP

(57) ABSTRACT

An information processing apparatus includes a reward processing unit configured to, when an unlock condition for a virtual reward is achieved, grant the virtual reward to a user who is playing a game, an operation acceptance unit configured to accept an operation to select a virtual reward that has not been acquired by the user, an obtainment unit configured to obtain information relating to one or more virtual rewards selected by the user, and a display processing unit configured to display the information obtained by the obtainment unit.

16 Claims, 15 Drawing Sheets

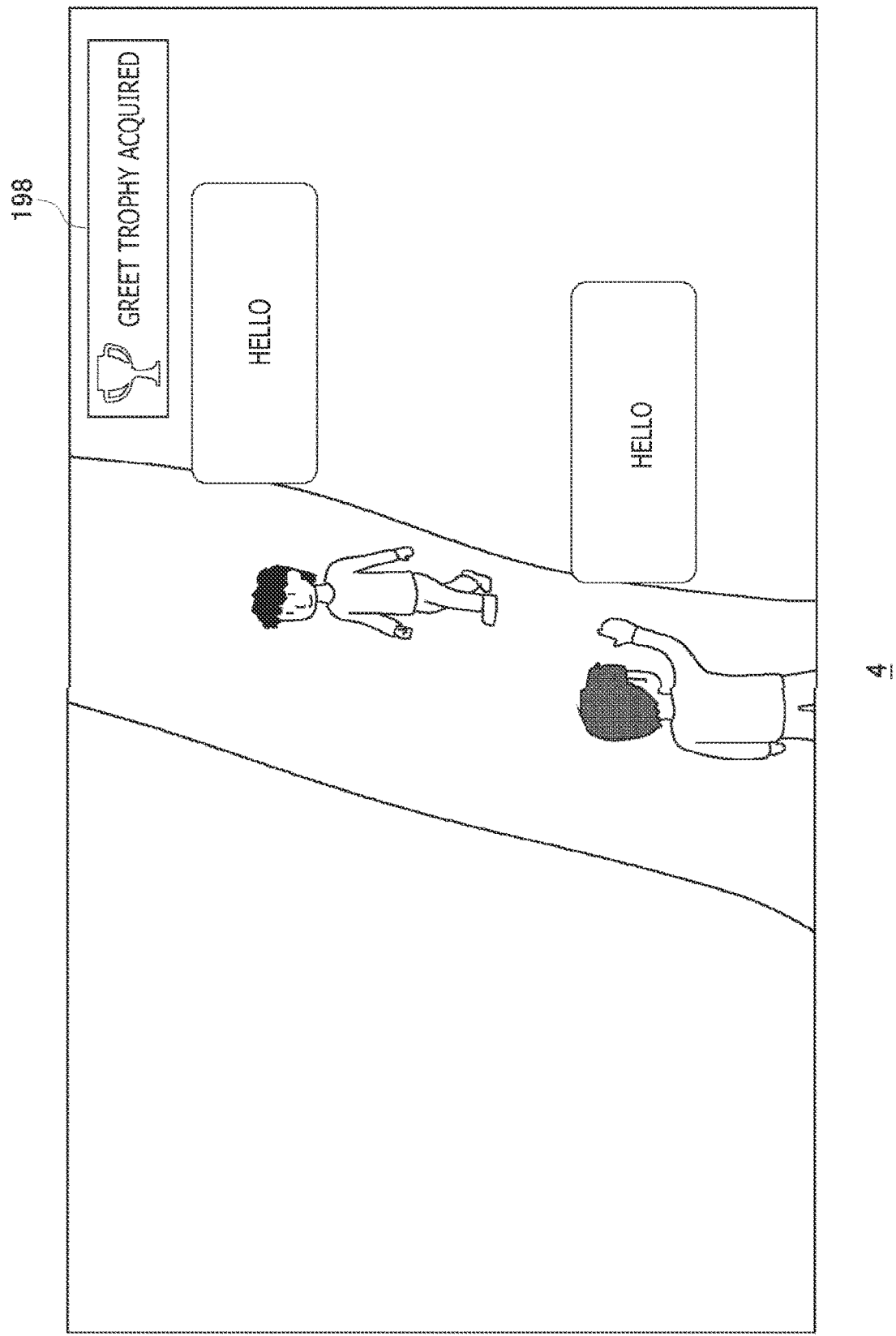

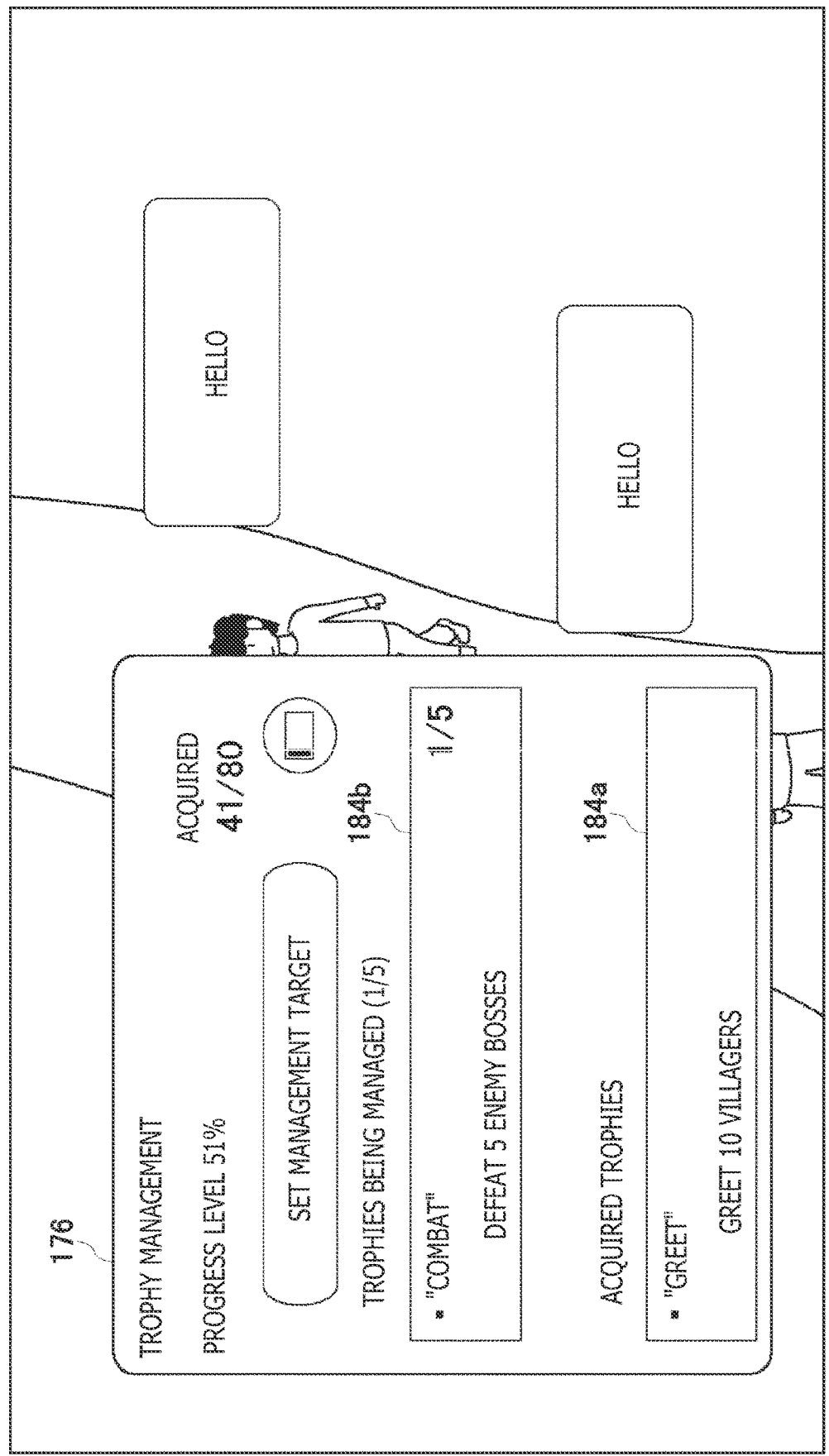

INFORMATION PROCESSING APPARATUS AND INFORMATION DISPLAY METHOD

CROSS REFERENCE TO RELATED APPLICATION

This application claims the benefit of Japanese Priority Patent Application JP 2021-146393 filed Sep. 8, 2021, the entire contents of which are incorporated herein by reference.

BACKGROUND

The present disclosure pertains to a technique for assigning a virtual reward to a user.

With an objective of imparting motivation to a user with respect to gameplay, a virtual reward (award) is granted to the user when the user clears a mission (unlock condition) set in a game. Japanese Patent Laid-Open No. 2016-97089 discloses a game system that grants a virtual reward referred to as a "trophy" to a user when the user clears a mission. In this game system, bronze, silver, and gold trophies are prepared according to difficulty of the mission. When the user acquires all prepared trophies, a special platinum trophy is granted to the user.

Japanese Patent Laid-Open No. 2021-62173 discloses a system that manages progress to achieve an unlock condition for a trophy. Japanese Patent Laid-Open No. 2021-62173 discloses, in relation to a trophy for which an unlock condition is not satisfied, that a progress bar indicating progress relating to achieving the unlock condition may be displayed.

SUMMARY

In a game system, trophy acquisition status is an index indicating a degree of fully completing a game. A user can compete with another user in terms of number of trophies acquired to thereby increase their motivation toward gameplay. A user activates a trophy application to manage information relating to trophies to thereby be able to access information relating to acquired trophies or unacquired trophies, but various operations must be performed to reach information they desire to know, and this takes time. When comparing acquired trophies and unacquired trophies, the user often has high interest in information relating to unacquired trophies, and, at present, a mechanism for the user to be able to easily access information relating to unacquired trophies has not been constructed.

Accordingly, in the present disclosure, it is desirable to realize a mechanism for supporting acquisition of a virtual reward by a user.

According to an embodiment of the present disclosure, there is provided an information processing apparatus. The information processing apparatus includes a reward processing unit configured to, when an unlock condition for a virtual reward is achieved, grant the virtual reward to a user who is playing a game, an operation acceptance unit configured to accept an operation to select a virtual reward that has not been acquired by the user, an obtainment unit configured to obtain information relating to one or more virtual rewards selected by the user, and a display processing unit configured to display the information obtained by the obtainment unit.

An information display method according to another aspect of the present disclosure includes granting, when an unlock condition for a virtual reward is achieved, the virtual reward to a user who is playing a game, accepting an operation to select a virtual reward that has not been acquired by the use, obtaining information relating to one or more virtual rewards selected by the user, and displaying the obtained information.

Note that any combination of the above components, or a result of converting expressions in the present disclosure between a method, an apparatus, a system, a recording medium, a computer program, etc., are also valid as aspects of the present disclosure.

BRIEF DESCRIPTION OF THE DRAWINGS

FIG. 14 illustrates an example of acquisition information overlappingly displayed on a game screen; and FIG. 15 illustrates an example of a system image relating to trophy management.

DETAILED DESCRIPTION OF THE PREFERRED EMBODIMENTS

Description is given for an outline of the present disclosure. In an information processing system according to an embodiment, a user plays game software which has been installed on an information processing apparatus. When an event occurs, the game software outputs an event code identifying the event having occurred to system software. An event occurs when there is change in gameplay progress or there is change in an action by a game character, for example.

Various missions are set in the game. When a mission is cleared, a virtual reward (trophy) corresponding to the mission is granted to the user. A condition for clearing a mission is a play condition for releasing the trophy to the user and is also referred to below as a trophy "unlock condition." When game software outputs an event code, the system software derives the progress level to achieve the unlock condition and determines that the unlock condition has been achieved when the progress level reaches 100%. Note that, in the embodiment, an information processing apparatus transmits an event code outputted by game software to an external server apparatus, and the external server apparatus also has a function for deriving the progress level for achieving the unlock condition.

Figure 1:
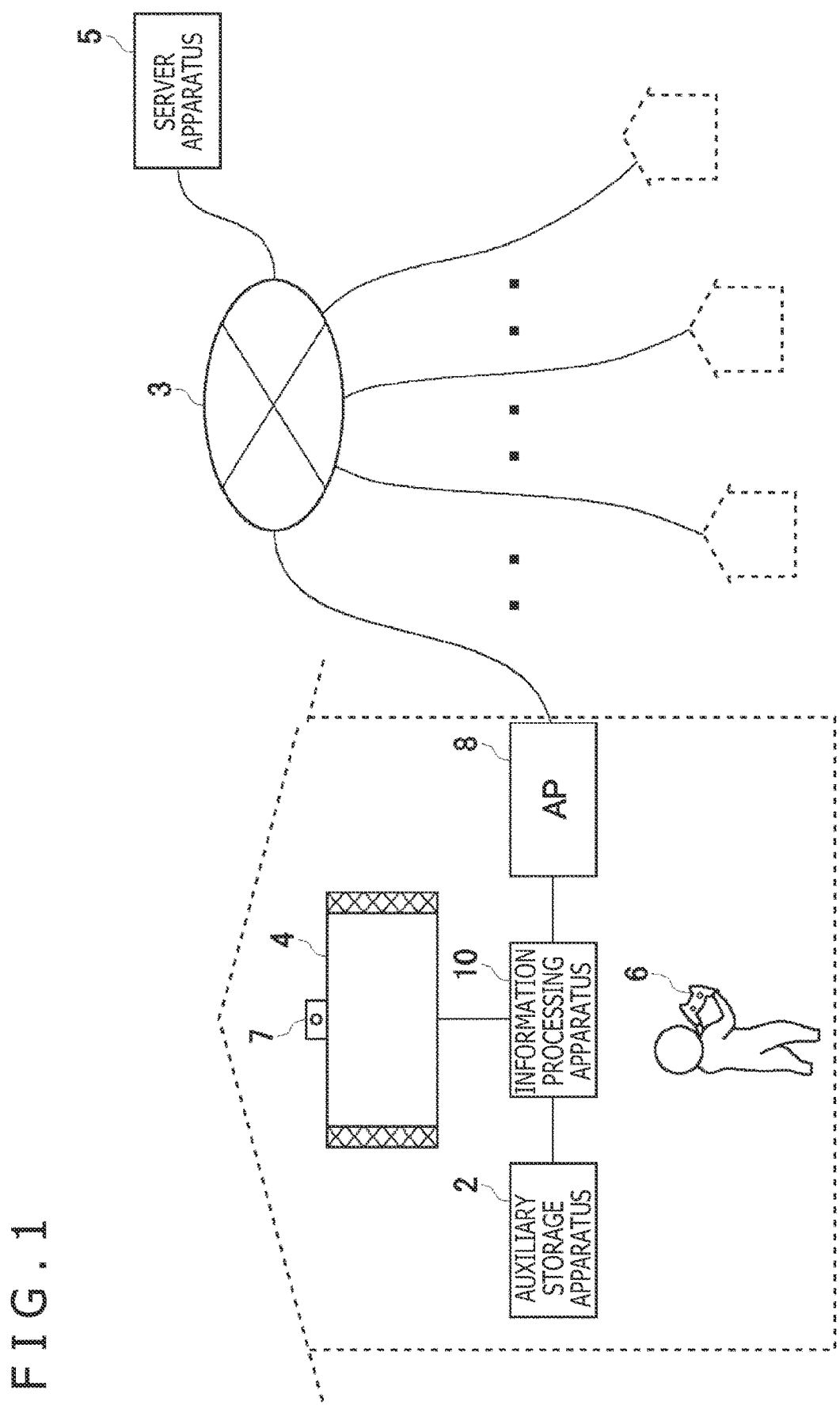
FIG. 1 illustrates an information processing system according to an embodiment.

FIG. 1 illustrates an information processing system 1 according to an embodiment of the present disclosure. The information processing system 1 may be a game system provided with an information processing apparatus 10 that a user operates, and a server apparatus 5. An access point (hereinafter referred to as an "AP") 8 has a wireless access point and a router functionality. The information processing apparatus 10 communicably connects to the server apparatus 5 on a network 3 by connecting to the AP 8 wirelessly or by wire. FIG. 1 illustrates only one information processing apparatus 10, but a plurality of information processing apparatuses 10 may connect to the server apparatus 5 via the network 3.

The information processing apparatus 10 connects to an input device 6 operated by a user by wire or wireless. The input device 6 outputs, to the information processing apparatus 10, information resulting from the user performing an operation. Upon accepting operation information from the input device 6, the information processing apparatus 10 reflects the operation information to processing by system software or game software and causes a result of processing to be outputted from an output apparatus 4. In the information processing system 1, the information processing apparatus 10 may be a game apparatus (game console) that executes a game, and the input device 6 may be a device such as a game controller that supplies operation information from a user to the information processing apparatus 10. Note that the input device 6 may be an input interface such as a keyboard or a mouse.

An auxiliary storage apparatus 2 is a large-capacity recording apparatus such as a hard disk drive (HDD) or a solid-state drive (SSD), may be a built-in type recording apparatus, or may be an external recording apparatus connected to the information processing apparatus 10 by, for example, a universal serial bus (USB). The output apparatus 4 may be a television that has a display for outputting an image and a speaker for outputting audio, but the output apparatus 4 may be a head-mounted display (HMD). The output apparatus 4 may be connected to the information processing apparatus 10 by a wired cable or may be wirelessly connected to the information processing apparatus 10.

A camera 7 which is an image capturing apparatus is provided near the output apparatus 4 and captures the space in the vicinity of the output apparatus 4. FIG. 1 illustrates an example in which the camera 7 is attached to the top of the output apparatus 4, but the camera 7 may be disposed on a side or the bottom of the output apparatus 4. In any case, the camera 7 is disposed at a position that enables capturing of a user who is positioned in front of the output apparatus 4. The camera 7 may be a stereo camera.

The server apparatus 5 provides a network service to the user of the information processing system 1. The server apparatus 5 manages a network account which identifies the user, and the user uses the network account to sign in to the network service provided by the server apparatus 5. By the user signing in to the network service, the information processing apparatus 10 can transmit, to the server apparatus 5, save data for a game or an event code outputted by game software.

Figure 2:
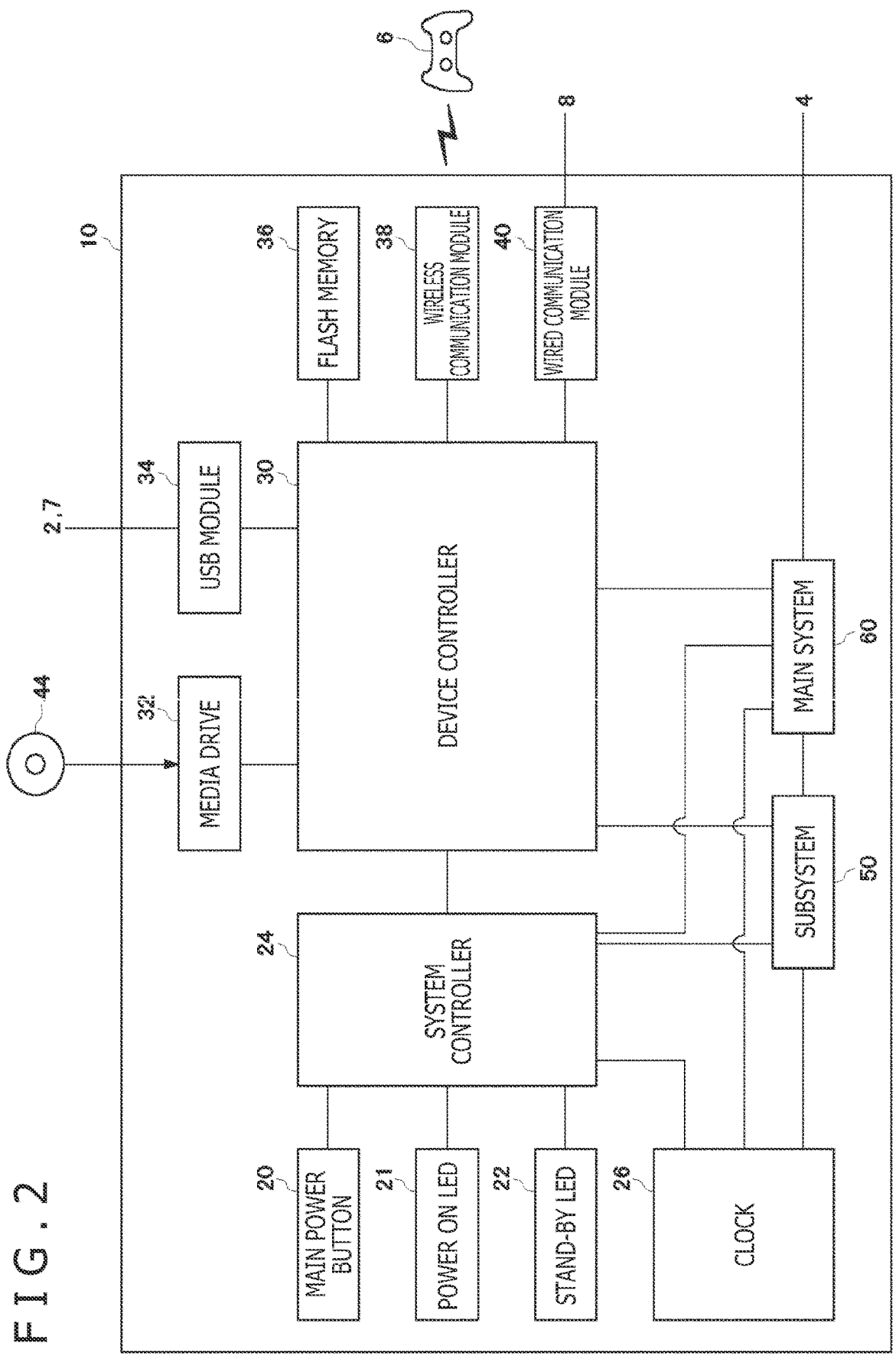
FIG. 2 illustrates a hardware configuration of an information processing apparatus.

FIG. 2 illustrates a hardware configuration of the information processing apparatus 10. The information processing apparatus 10 includes a main power button 20, a power ON light emitting diode (LED) 21, a stand-by LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a memory which is a main storage apparatus, a memory controller, a graphics processing unit (GPU), etc. The GPU is mainly used in arithmetic processing for a game program. The main CPU has functionality for activating system software and executing a game program installed in the auxiliary storage apparatus 2 in an environment provided by the system software. The subsystem 50 includes a sub CPU, a memory that is a main storage apparatus, a memory controller, etc., and is not provided with a GPU.

The main CPU has a function for executing a game program installed onto the auxiliary storage apparatus 2, but the sub CPU does not have such a function. However, the sub CPU has a function for accessing the auxiliary storage apparatus 2, and a function for transmitting and receiving data to and from the server apparatus 5. The sub CPU includes only such limited processing functionality, and therefore can operate with lower power consumption than the main CPU. These functions of the sub CPU are executed when the main CPU is in a standby state.

The main power button 20 is an input unit with respect to which an operation input is performed by a user, is provided on the front surface of the housing of the information processing apparatus 10, and is operated in order to turn supply of power to the main system 60 in the information processing apparatus 10 on or off. The power supply ON LED 21 lights up when the main power button 20 is turned on, and the stand-by LED 22 lights up when the main power button 20 is turned off. The system controller 24 detects a press of the main power button 20 by a user.

The clock 26 is a real-time clock, generates current date and time information, and supplies this current date and time information to the system controller 24 or the subsystem 50 and the main system 60.

The device controller 30 is configured as a large-scale integrated circuit (LSI) that executes the handover of information between devices, as with a southbridge. As illustrated, devices such as the system controller 24, the media drive 32, the USB module 34, the flash memory 36, the wireless communication module 38, the wired communication module 40, the subsystem 50, and the main system 60 are connected to the device controller 30. The device controller 30 controls the timings of data transfers by absorbing differences in electrical characteristics or differences in data transfer speeds between respective devices.

The media drive 32 is a drive device that is mounted with and drives a ROM medium 44 to which is recorded license information and application software such as a game, and reads out a program, data, etc., from the ROM medium 44. The ROM medium 44 is read-only recording media such as an optical disk, a magneto-optical disk, or a Blu-ray Disc.

The USB module 34 is a module for connecting to an external device by a USB cable. The USB module 34 may be connected to the auxiliary storage apparatus 2 and the camera 7 by a USB cable. The flash memory 36 is an auxiliary storage apparatus that configures an internal storage. The wireless communication module 38 wirelessly communicates with the input device 6, for example, by a communication protocol such as a Bluetooth (registered trademark) protocol or an IEEE 802.11 protocol. The wired communication module 40 performs wired communication with an external device and is connected to the network 3 via the AP 8, for example.

Figure 3:
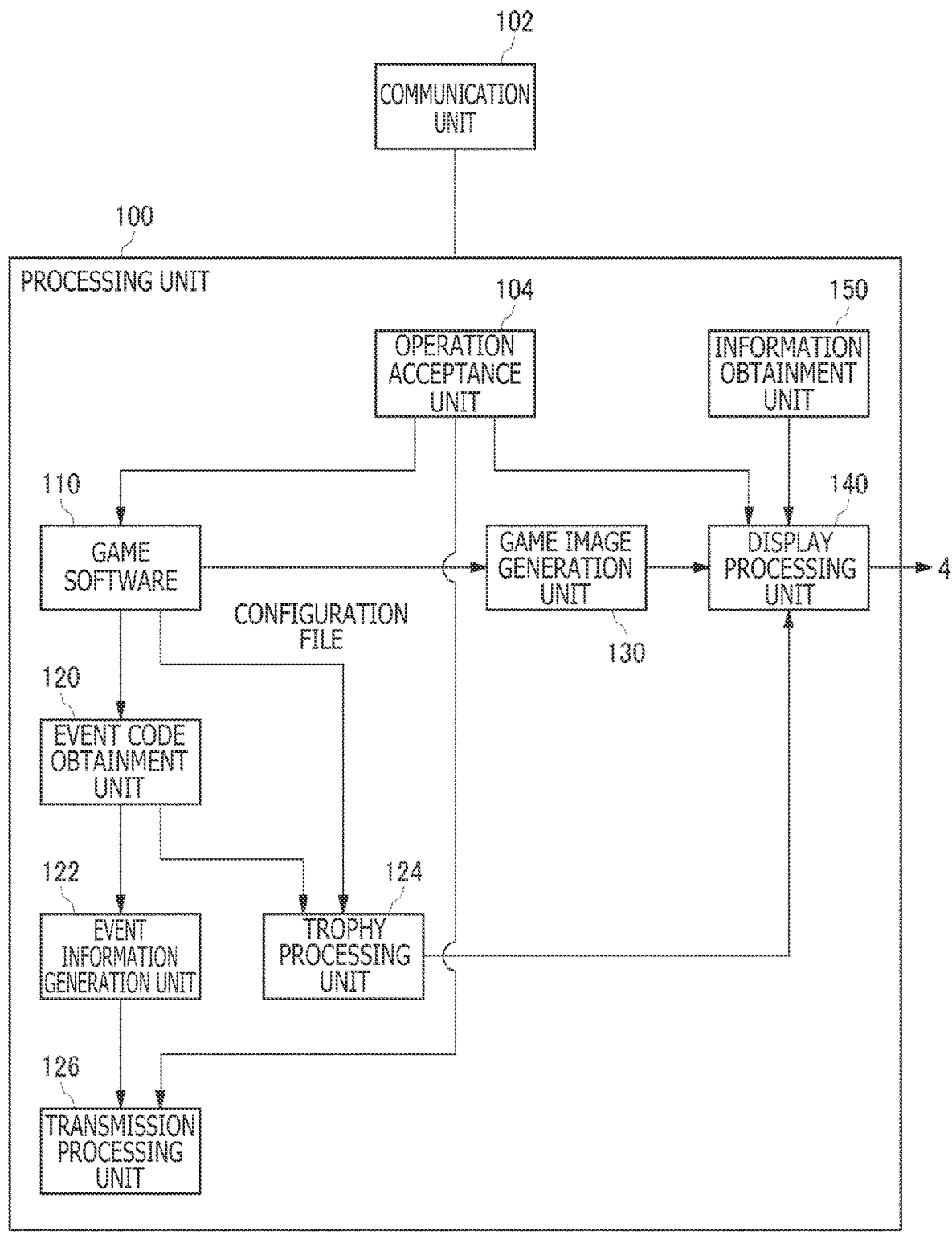
FIG. 3 illustrates functional blocks for the information processing apparatus.

FIG. 3 illustrates functional blocks for the information processing apparatus 10. The information processing apparatus 10 includes a processing unit 100 and a communication unit 102. The communication unit 102 is expressed as a configuration that has functionality for both the wireless communication module 38 and the wired communication module 40 illustrated in FIG. 2. The processing unit 100 includes an operation acceptance unit 104, game software 110, an event code obtainment unit 120, an event information generation unit 122, a trophy processing unit 124, a transmission processing unit 126, a game image generation unit 130, a display processing unit 140, and an information obtainment unit 150. The operation acceptance unit 104 accepts, via the communication unit 102, operation information that is from the input device 6 and is inputted by a user.

Each element set forth as a functional block for performing various processing in the information processing apparatus 10 in FIG. 3 can be configured in hardware terms by a circuit block, a memory, another LSI, or a CPU, or realized in software terms by, for example, a program loaded into a memory. Accordingly, a person skilled in the art would understand that these functional blocks can be realized in various forms by only hardware, only software, or a combination of hardware and software, and that these functional blocks are not limited to one of these forms.

The game software 110 includes at least a game program, image data, audio data, and a configuration file. The game program receives operation information a user made with respect to the input device 6 and performs arithmetic processing to move a game character in a virtual space. The game image generation unit 130 includes a graphics processing unit (GPU) for executing rendering processing, etc., and generates game image data. Note that the processing unit 100 includes an audio data generation unit for generating game audio data but illustration of the audio data generation unit is omitted in FIG. 3. The display processing unit 140 outputs the game image from the output apparatus 4.

When an event occurs during game progress, the game program outputs an event code indicating the event having occurred. The event code obtainment unit 120 obtains the event code from the game software 11 and provides the event code to the event information generation unit 122 and the trophy processing unit 124. The event information generation unit 122 generates event information resulting from adding, to the event code, time information (a time stamp) indicating the time at which the event has occurred and provides the event information to the transmission processing unit 126. The transmission processing unit 126 transmits the generated event information to the server apparatus 5.

A game developer may set up various events in the game. An event code is allocated to each event code, and, when an event occurs, the game program may output the event code after adding game data indicating the state of the game when the event has occurred to the event code indicating the event has occurred. Game data includes peripheral information such as a location where the event has occurred, a character interacted with, or a target object. For example, when combat with an enemy boss is started, the game program may add game data indicating the combat location and a character identification (ID) of the enemy boss to an event code indicating the start of combat, and then output the event code.

Various missions are set in the game. When user clears a mission, a virtual reward (trophy) corresponding to the mission is granted to the user. A plurality of types of trophies that correspond to the difficulty of missions in the game may be prepared, and bronze, silver, and gold trophies in order from easiest difficulty may be prepared.

The configuration file included in the game software 110 records, in association, a trophy and a condition for unlocking the trophy. For example, in a case where the event "greet villagers" (a greeting event) is set, the game program outputs an event code for the greeting event when a player character greets villagers. Here, in a case where the bronze trophy referred to as "greet" is prepared and the unlock condition for this trophy is a player character greeting ten villagers, the configuration file records, in association, the "greet" bronze trophy and outputting ten event codes for greeting events.

In addition, in a case where an event "defeat enemy boss" (an end-of-combat event) is set, the game program outputs an event code for an end-of-combat event when a player character defeats an enemy boss. Here, in a case where a silver trophy referred to as "combat" is prepared and the unlock condition for this trophy is a player character defeating five enemy bosses, the configuration file records, in association, the "combat" silver trophy and the output of five event codes for end-of-combat events. Note that unlock conditions for a plurality of types of bronze trophies, unlock conditions for a plurality of types of silver trophies, and unlock conditions for a plurality of types of gold trophies are recorded in an actual configuration file.

When an unlock condition is achieved for a trophy which is a virtual reward, the trophy processing unit 124 functions as a reward processing unit that grants the trophy to a user who is playing the game. Specifically, the trophy processing unit 124, upon being provided with an event code from the event code obtainment unit 120, refers to the configuration file and performs achievement determination processing for a trophy unlock condition. Upon determining that an unlock condition has been achieved, the trophy processing unit 124 generates unlocked trophy acquisition information and stores the acquisition information in a storage unit (not illustrated). The trophy acquisition information includes identification information that identifies the game (a game ID), identification information that identifies the unlocked trophy (a trophy ID), and time information (a time stamp) for when the unlock has occurred. The transmission processing unit 126 may transmit the trophy acquisition information to the server apparatus 5, but the later-described server apparatus 5 includes a trophy processing unit similar to the trophy processing unit 124 and has a function for performing achievement determination processing for a trophy unlock condition. Therefore, the transmission processing unit 126 may not transmit the trophy acquisition information to the server apparatus 5.

Figure 4:
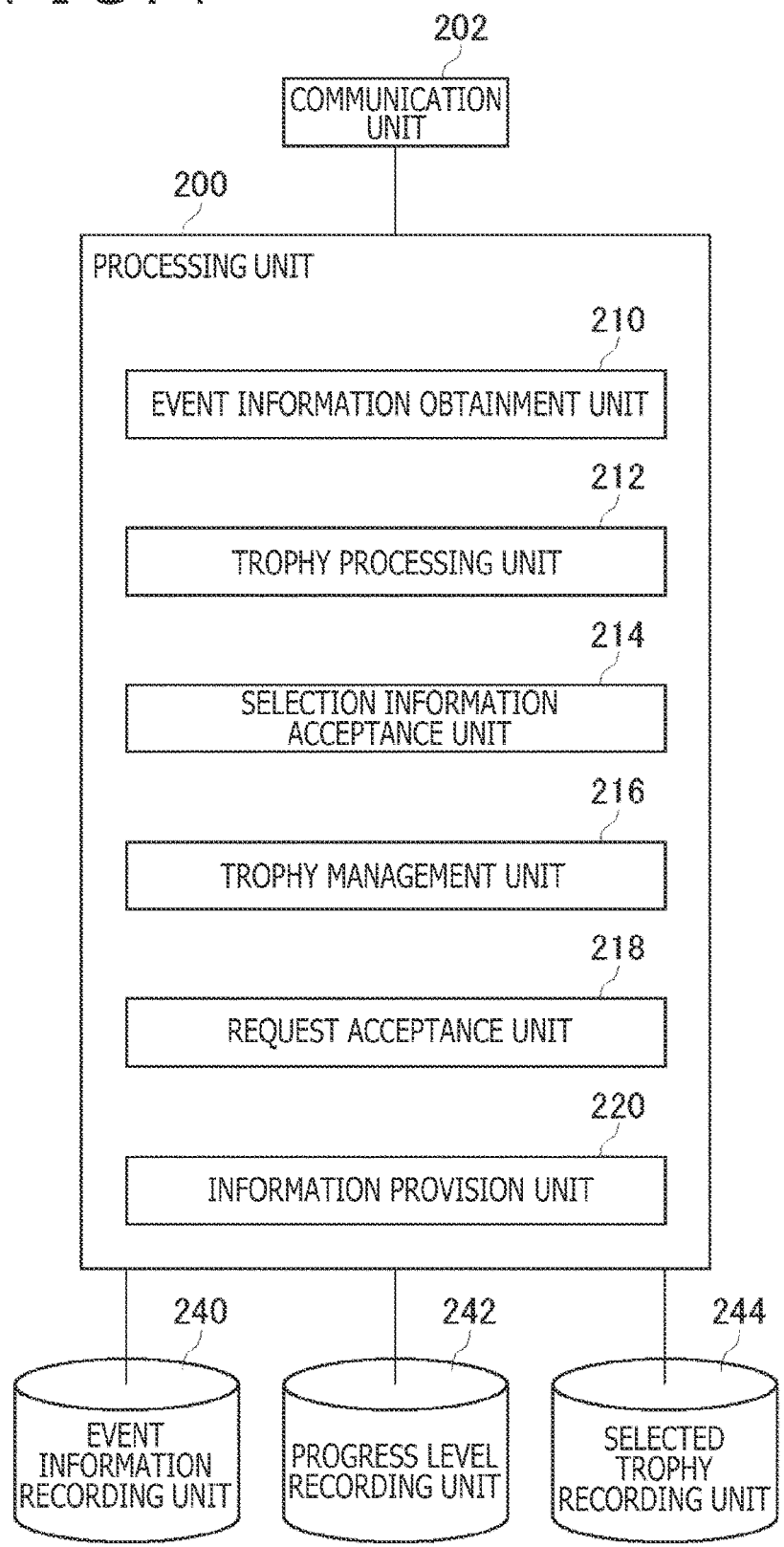
FIG. 4 illustrates functional blocks for a server apparatus.

FIG. 4 illustrates functional blocks for the server apparatus 5. The server apparatus 5 includes a processing unit 200, a communication unit 202, an event information recording unit 240, a progress level recording unit 242, and a selected trophy recording unit 244. The processing unit 200 has an event information obtainment unit 210, a trophy processing unit 212, a selection information acceptance unit 214, a trophy management unit 216, a request acceptance unit 218, and an information provision unit 220.

Each element set forth as a functional block for performing various processing in the server apparatus 5 in FIG. 4 can be configured in hardware terms by a circuit block, a memory, another LSI, or a CPU, or realized in software terms by, for example, a program loaded into a memory. Accordingly, a person skilled in the art would understand that these functional blocks can be realized in various forms by only hardware, only software, or a combination of hardware and software, and that these functional blocks are not limited to one of these forms.

The event information obtainment unit 210 obtains event information from the information processing apparatus 10 and records the event information in the event information recording unit 240. Specifically, the event information recording unit 240 records, in the event information recording unit 240, event information for each game title linked to a network account for the user.

The trophy processing unit 212 in the server apparatus 5 includes similar functionality to that of the trophy processing unit 124 in the information processing apparatus 10. The trophy processing unit 212 refers to the configuration file in the game software 110 to perform achievement determination processing for a trophy unlock condition, from event information recorded in the event information recording unit 240. The trophy processing unit 212 may perform the achievement determination processing for a trophy unlock condition each time the event information obtainment unit 210 obtains event information and records the event information in the event information recording unit 240.

When the event information obtainment unit 210 records new event information to the event information recording unit 240, the trophy processing unit 212 specifies game software corresponding to the event information and reads out the configuration file for the game software from a storage unit (not illustrated). For example, in a case where an event code for a greeting event is included in event information, the trophy processing unit 212 specifies an unlock condition for a trophy relating to the greeting event from the configuration file and performs achievement determination processing for the unlock condition. In the embodiment, the trophy processing unit 212 specifies a "greet" bronze trophy, investigates the number of event codes for greeting events accumulated in the event information recording unit 240, and derives a progress level (level of achievement) for achieving the unlock condition. For example, if six greeting event codes are accumulated in the event information recording unit 240, the trophy processing unit 212 derives a progress level of 60% (=6/10).

As another example, if ten greeting event codes are accumulated in the event information recording unit 240, the trophy processing unit 212 derives a progress level of 100% (=10/10). A progress level of 100% means that the unlock condition has been achieved, in other words that the user has acquired the trophy. The trophy processing unit 212 records the derived progress level for achieving an unlock condition in the progress level recording unit 242, linked with the network account for the user and the trophy ID. Note that, because the progress level recording unit 242 records a progress level that is derived when the greeting event code is obtained previously, the trophy processing unit 212 may overwrite and update the previously derived progress level with a currently derived progress level. The progress level recording unit 242 records the progress level for achieving the unlock condition, for all trophies in the game.

With the premise that achievement determination processing for an unlock condition is performed as above, description is given below regarding a mechanism for supporting the user's acquisition of a virtual reward. Returning to FIG. 3, during gameplay, the operation acceptance unit 104 accepts operation information from the input device 6 and supplies the operation information to the game software 110. The game software 110 executes arithmetic processing for moving a player character in a virtual space. The game image generation unit 130 generates, based on the operation information, game image data from a viewpoint position (a virtual camera) in the virtual space.

Figure 5:
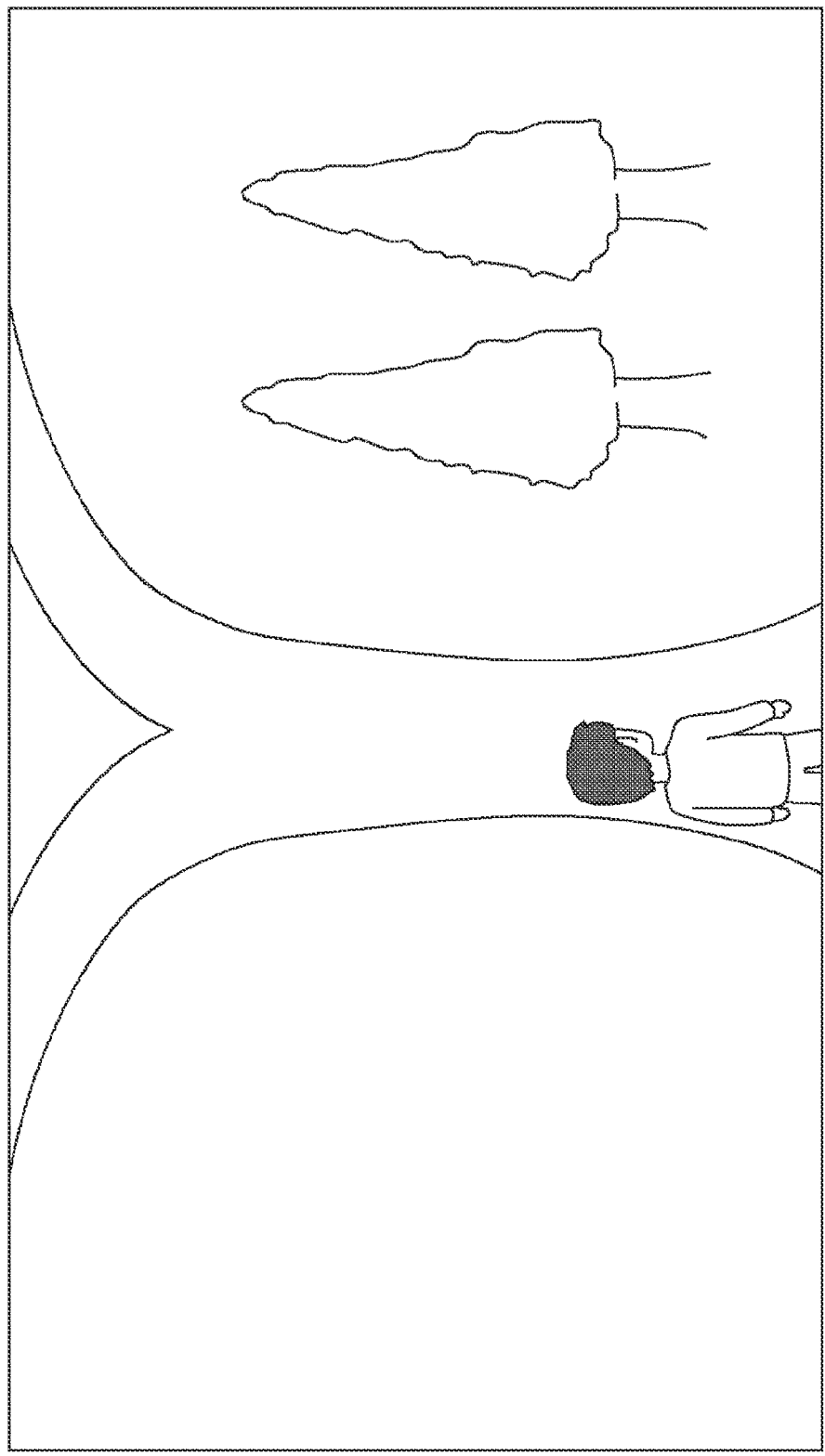
FIG. 5 illustrates an example of a game screen.

FIG. 5 illustrates an example of a game screen displayed by an output apparatus. The display processing unit 140 displays a game screen from the output apparatus 4. When a user operates a predetermined button (for example, a home button) on the input device 6 during gameplay, the operation acceptance unit 104 accepts operation information for the predetermined button, and the display processing unit 140 obtains a request to display a system image from the operation acceptance unit 104. In addition, the transmission processing unit 126 transmits the operation information for the predetermined button to the server apparatus 5.

In the server apparatus 5, the request acceptance unit 218 accepts, via the communication unit 202, the operation information for the predetermined button as an information transmission request. The information provision unit 220 specifies information relating to active game software in the information processing apparatus 10 or information inferred to have a high priority to the user and provides these items of information to the information processing apparatus 10 via the communication unit 202.

In the information processing apparatus 10, the information obtainment unit 150 obtains the information provided from the server apparatus 5. The display processing unit 140 generates one or more card-shaped system images based on the information provided from the server apparatus 5, and overlappingly displays these system images on the game screen. The display processing unit 140 may, for each unit of information, generate a card-shaped graphical user interface (GUI) that includes some of the information.

Figure 6:
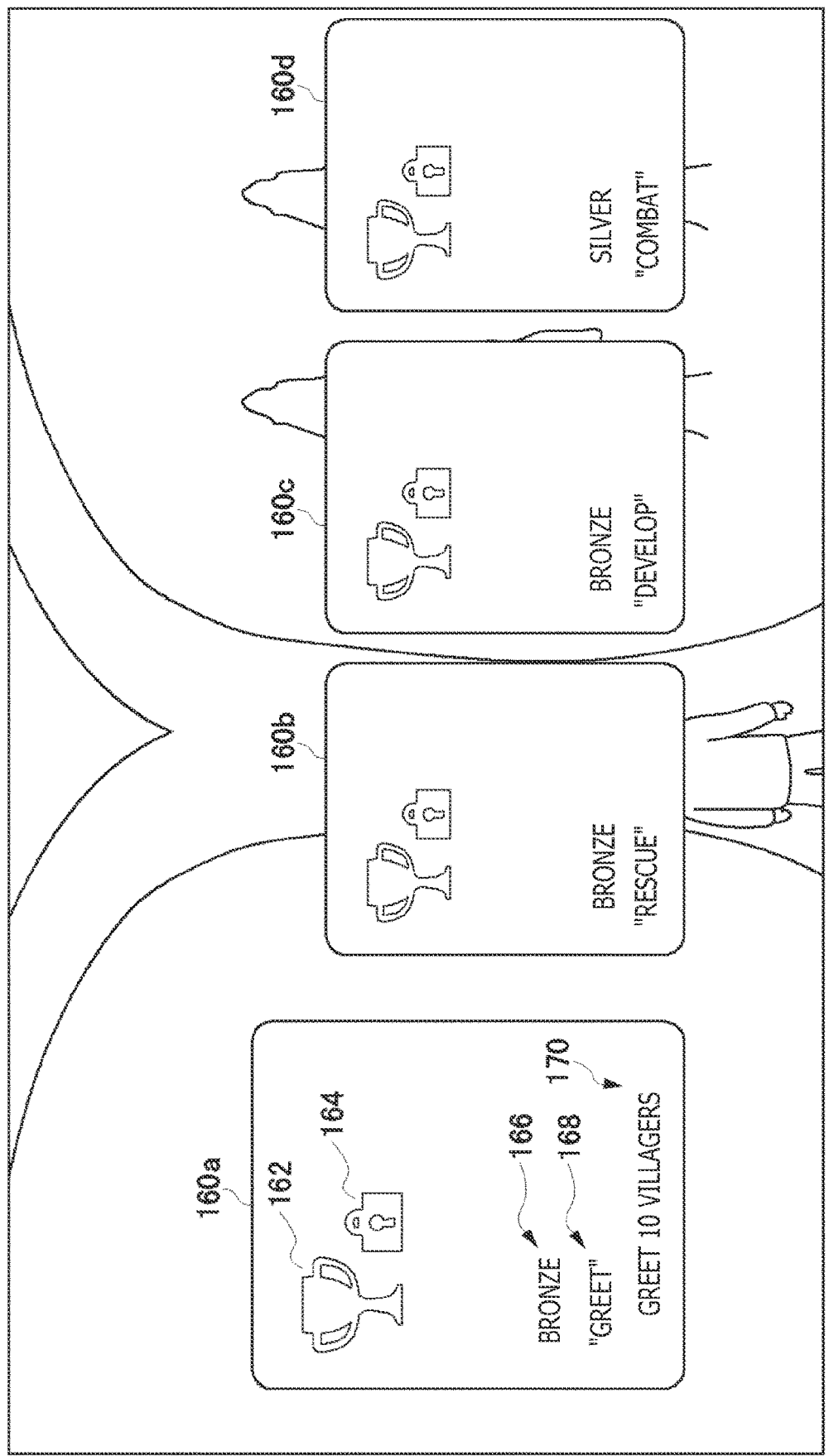
FIG. 6 illustrates an example of system images overlapped on a game screen.

FIG. 6 illustrates an example of system images overlapped on a game screen. When the user operates a predetermined button on the input device 6 during gameplay, the display processing unit 140 generates system images 160a, 160b, 160c, and 160d based on information obtained by the information obtainment unit 150, and overlappingly displays these system images on the game screen. In this example, the system images 160a, 160b, 160c, and 160d are trophy images that notify information relating to trophies in the game but may be system images that are not trophy images. Note that the plurality of system images 160 are in a state in which at one of the system images is selected, and the selected system image is displayed larger than the other system images. The user can operate arrow keys on the input device 6 to change the selected system image.

The system image 160a includes a trophy mark 162, a lock mark 164, trophy type information 166, a trophy name 168, and an unlock condition 170. The trophy mark 162 indicates that the system image is a trophy image. The lock mark 164 indicates that the trophy is in a locked state. When a trophy is unlocked, the lock mark 164 may be deleted from the trophy image or changed to a lock mark indicating an unlocked state. The trophy type information 166 indicates one type from among bronze, silver, and gold. The trophy name 168 indicates the name of the corresponding trophy. The unlock condition 170 indicates the unlock condition for acquiring the corresponding trophy.

The system image 160a which is in a selected state includes the unlock condition 170, but the system images 160b, 160c, and 160d which are not in a selected state do not include an unlock condition 170. In a case where a user wants to see the unlock condition 170 for the trophy "combat," for example, the user can select the system image 160d by operating the input device 6 to thereby cause the unlock condition 170 to be displayed inside the system image 160d.

Figure 7:
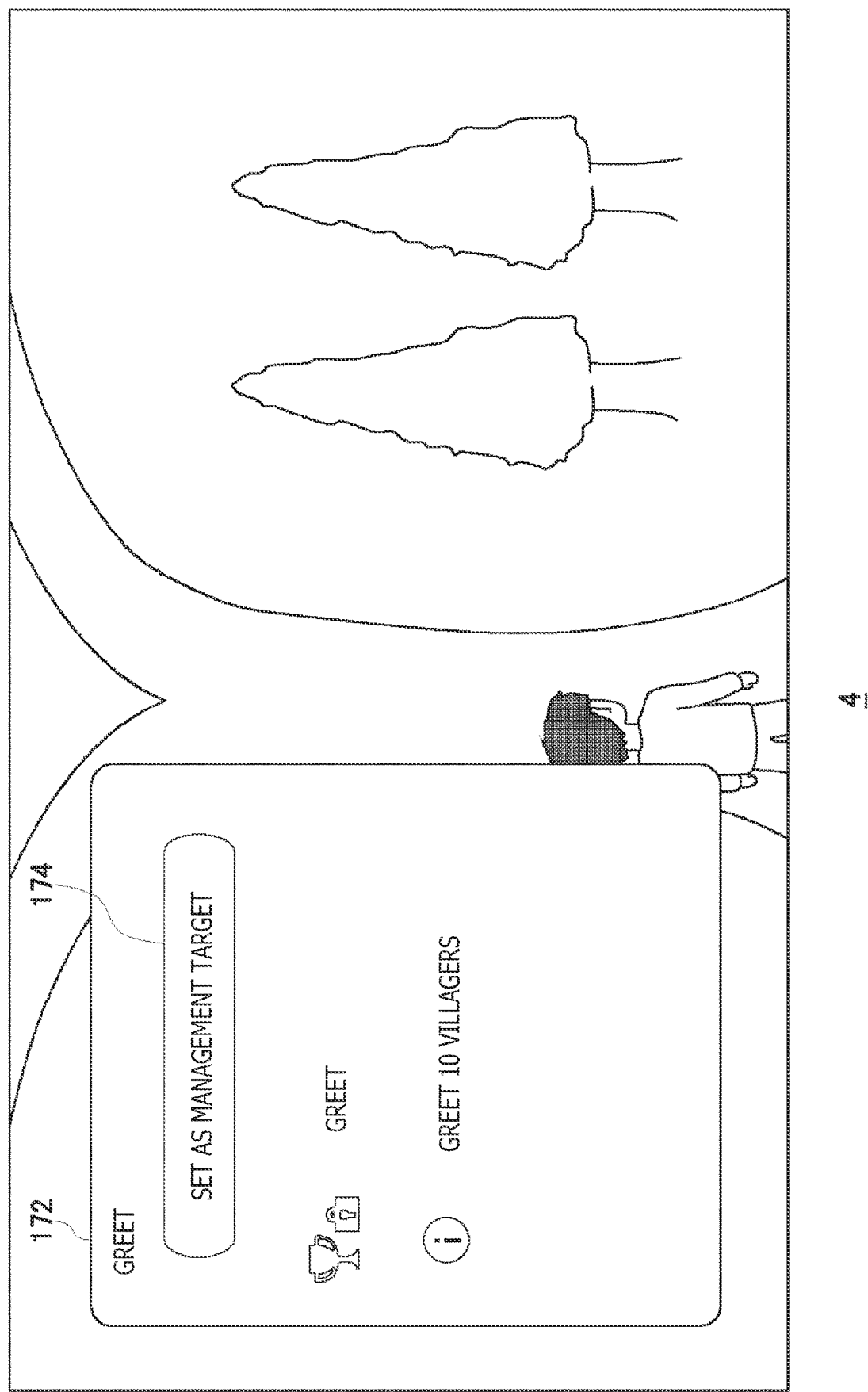
FIG. 7 illustrates an example of a system image relating to a trophy.

When a user operates a determination button on the input device 6 in a state where the system image 160a is selected, the display processing unit 140 displays a system image relating to the "greet" bronze trophy. FIG. 7 illustrates an example of a system image relating to the trophy. A system image 172 includes a management start button 174. When a user presses and operates the management start button 174, the operation acceptance unit 104 accepts an operation to select the "greet" trophy which the user has not acquired, and the "greet" trophy is selected as a management target. The transmission processing unit 126 transmits, to the server apparatus 5, information indicating that the user has selected the "greet" trophy as a management target.

In the information processing system 1 according to the embodiment, a user can select trophies as management targets up to a predetermined upper limit. In the embodiment, the user selects trophies, with an upper limit of five. Information relating to a group of trophies selected as management targets are displayed together in one system image, as described below. A user selects unacquired trophies that are interested in as a management target to thereby be able to easily access information relating to the trophy.

In the server apparatus 5, the selection information acceptance unit 214 accepts information (trophy ID) specifying the trophy ID the user has selected as a management target. The trophy management unit 216 records information specifying the selected trophy as a management target in the selected trophy recording unit 244. The information provision unit 220 provides the information processing apparatus 10 with information that pertains to management targets and that is recorded in the selected trophy recording unit 244.

Figure 8:
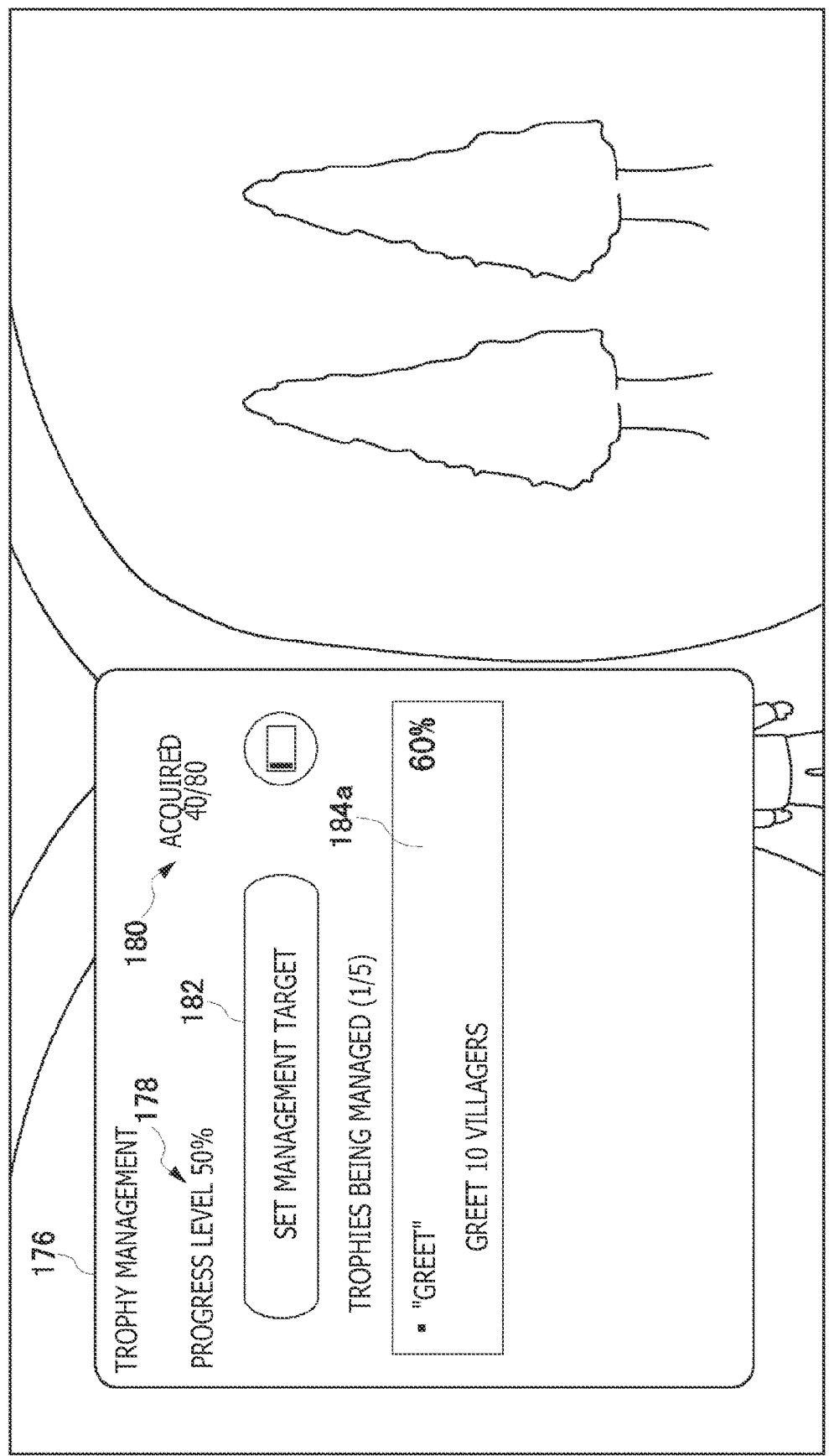
FIG. 8 illustrates an example of a system image relating to trophy management.

FIG. 8 illustrates an example of a system image relating to trophy management. When a user presses and operates the management start button 174 in the system image 172 illustrated in FIG. 7, the information obtainment unit 150 obtains information relating to a trophy selected by the user as a management target from the server apparatus 5, and the display processing unit 140 displays a system image 176 that pertains to trophy management.

The system image 176 includes progress level information 178, acquisition information 180, a management target setting button 182, and trophy information 184a. The progress level information 178 indicates a progress level for trophy acquisition in the game, and the acquisition information 180 indicates (number of trophies acquired)/(total number of trophies). The trophy information 184a includes at least the name of a trophy being managed, and information indicating an unlock condition. Information indicating the unlock condition for the trophy is included in the trophy information 184a, whereby a user can merely view the system image 176 to simply recognize the unlock condition for a trophy of interest. Note that the trophy information 184a may include progress level information for achieving the unlock condition. In the trophy information 184a, the progress level information is expressed as "60%," but, for example, may be expressed in the form of a progress bar or may be expressed in the form of the fraction (number of events that have occurred)/(number of events required for trophy acquisition). The trophy information 184a includes the unlock condition and the progress level information, whereby the user can confirm which kind of gameplay is required in order to acquire the trophy.

The management target setting button 182 is a button that opens a system image for a user to set a management target. When a user presses and operates the management target setting button 182, the transmission processing unit 126 transmits to the server apparatus 5 a request to generate an image relating to trophy settings. When the request acceptance unit 218 accepts the request to generate the image relating to the trophy setting, the information provision unit 220 provides the information processing apparatus 10 with information necessary to generate the image relating to the trophy setting, and the information obtainment unit 150 obtains this information.

Figure 9:
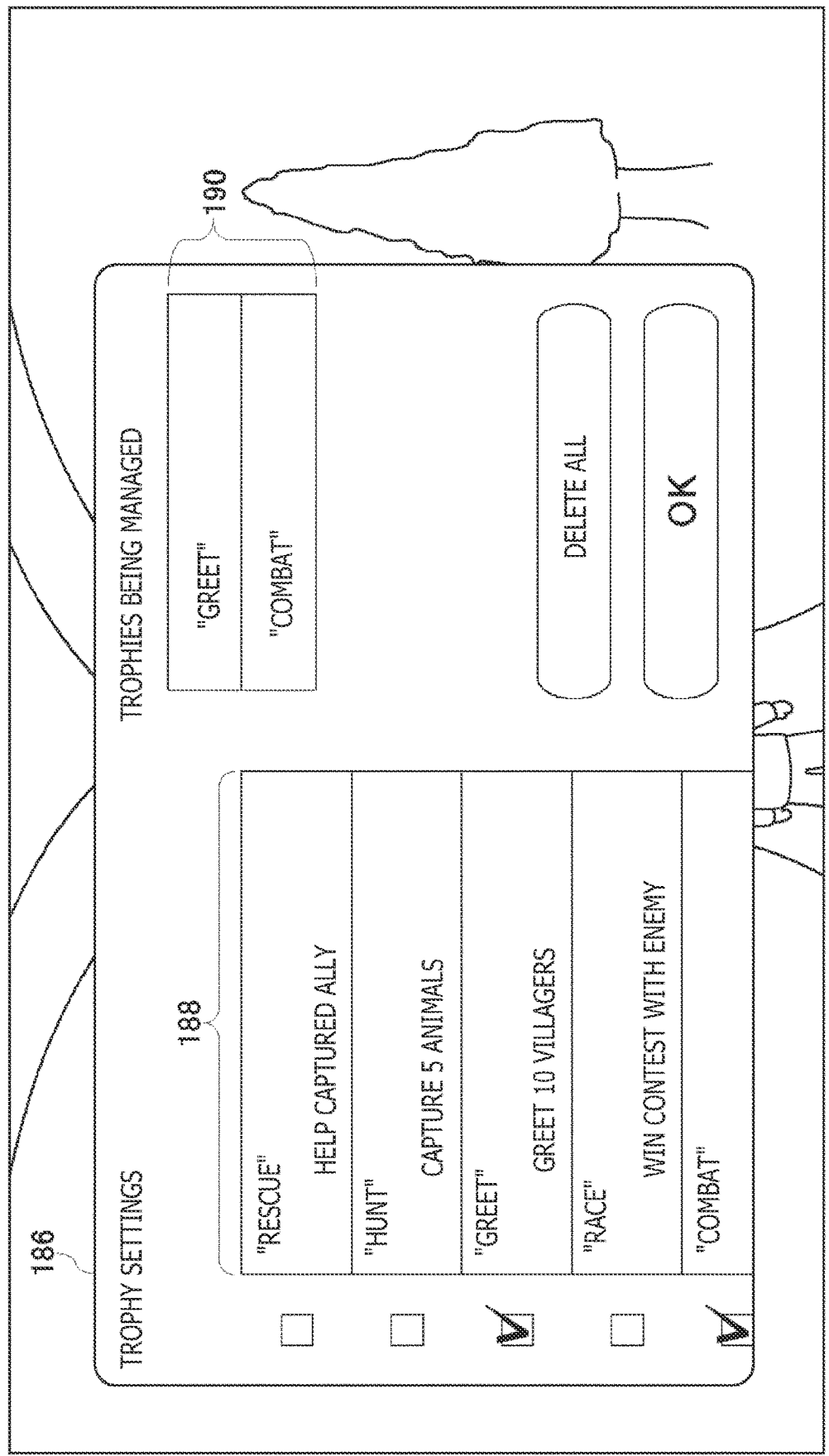
FIG. 9 illustrates an example of a system image relating to trophy settings.

FIG. 9 illustrates an example of a system image relating to trophy settings. The display processing unit 140 overlappingly displays, on a game screen, a system image 186 that includes a list display region 188 displaying a list of trophy information regarding unacquired trophies and a management target display region 190 displaying a list of trophies selected as management targets. Trophy information in the list display region 188 includes names of trophies and information indicating unlock conditions. The list display region 188 is configured so as to be able to scroll vertically. A user can select from the list display region 188 a number of trophies up to and including the upper limit. This example illustrates a situation in which a user has selected the "combat" trophy in addition to the "greet" trophy which has been already selected. The user selects the "combat" trophy in the list display region 188, whereby the management target display region 190 displays the "greet" trophy and the "combat" trophy as management targets.

In the list display region 188, a user marks a checkbox to select a trophy and removes a mark from a checkbox to cancel selection of a trophy. The list display region 188 may include a hidden trophy. Note that a hidden trophy is included in the list in a state where information regarding the trophy is not displayed. By once carrying out a procedure to cause the list display region 188 to display information relating to hidden trophy, the trophy name and the unlock condition are displayed, and the user becomes able to select the hidden trophy as a management target.

The user can select a number of trophies as management targets, up to and including the upper limit number. The upper limit number of trophies that can be selected is five in the embodiment. Accordingly, the user may select up to five trophies to be management targets. When the user presses and operates the OK button in the state illustrated in FIG. 9, the operation acceptance unit 104 accepts an operation for selecting the "greet" trophy and the "combat" trophy that the user has not acquired, and the transmission processing unit 126 transmits information (trophy IDs) specifying the selected trophies to the server apparatus 5.

In the server apparatus 5, the selection information acceptance unit 214 accepts the information specifying the trophies the user selected as management targets, and the trophy management unit 216 records the information specifying the "greet" trophy and the "combat" trophy in the selected trophy recording unit 244. The information provision unit 220 may promptly provide the information processing apparatus 10 with the information relating to management targets that is recorded in the selected trophy recording unit 244.

Figure 10:
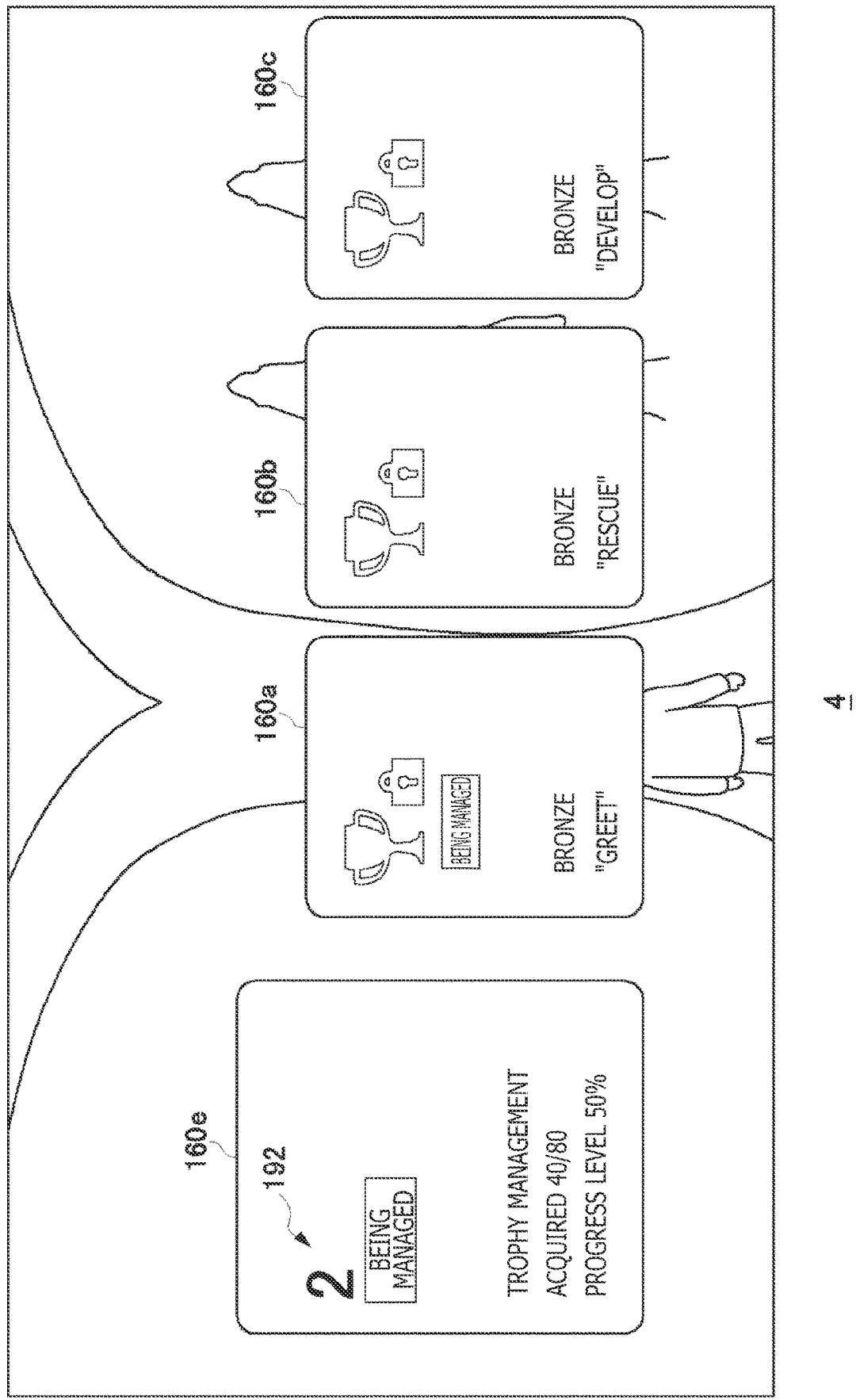
FIG. 10 illustrates an example of system images overlapped on a game screen.

FIG. 10 illustrates an example of system images overlapped on a game screen. When a trophy which is to be a management target is set, the display processing unit 140 overlappingly displays, on a game screen, a system image 160e that expresses that trophy management is being performed. Note that, if there is no trophy that is to be a management target, the display processing unit 140 does not display the system image 160e. In the system image 160e, management information 192 indicates the number of trophies that are currently being managed. A mark indicating that management is being performed is displayed in the system image 160a for the "greet" trophy which has been set as a management target. As a result, a user can view the trophy image to discriminate whether or not the trophy is being managed.

Figure 11:
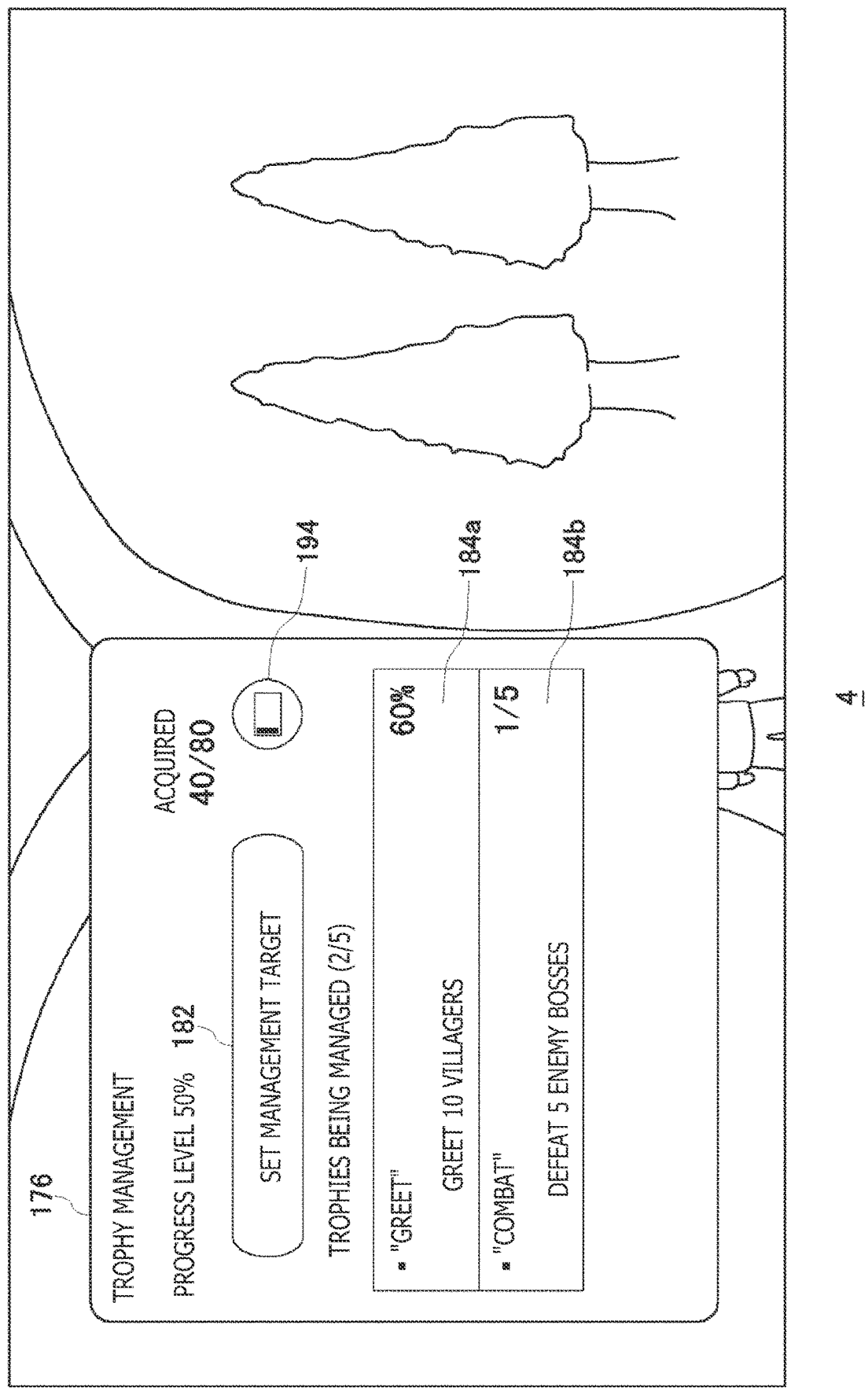
FIG. 11 illustrates an example of a system image relating to trophy management.

When a user operates a determination button on the input device 6 in a state where the system image 160e is selected, the display processing unit 140 displays a system image relating to trophy management. FIG. 11 illustrates an example of a system image relating to trophy management. When a user operates the determination button on the input device 6 in a state where the system image 160e illustrated in FIG. 10 is selected, the information obtainment unit 150 obtains information relating to one or more trophies selected by the user as a management target from the server apparatus 5, and the display processing unit 140 displays a system image 176 that pertains to trophy management.

In this example, the system image 176 includes two items of trophy information, trophy information 184a and 184b. The items of trophy information 184a and 184b each includes at least the name of a trophy being managed, and information indicating an unlock condition. The display processing unit 140 displays one or more items of trophy information in one card-shaped display region, whereby a user can easily access information relating to a trophy of interest. In addition, information indicating the unlock condition for the trophy is included in the trophy information 184a, whereby a user can merely view the system image 176 to simply recognize the unlock condition for a trophy of interest. Note that the trophy information 184a and 184b may include progress level information for achieving unlock conditions. In the trophy information 184a, the progress level information is expressed as a progress rate (%). In the trophy information 184b, the progress level information is expressed in the form of the fraction (number of events that have occurred)/(number of events required for trophy acquisition). However, the progress level may be expressed in the form of a progress bar. The trophy information 184a and 184b each include the unlock condition and the progress level information, whereby the user can confirm which kind of gameplay is required in order to acquire each trophy.

Figure 12:
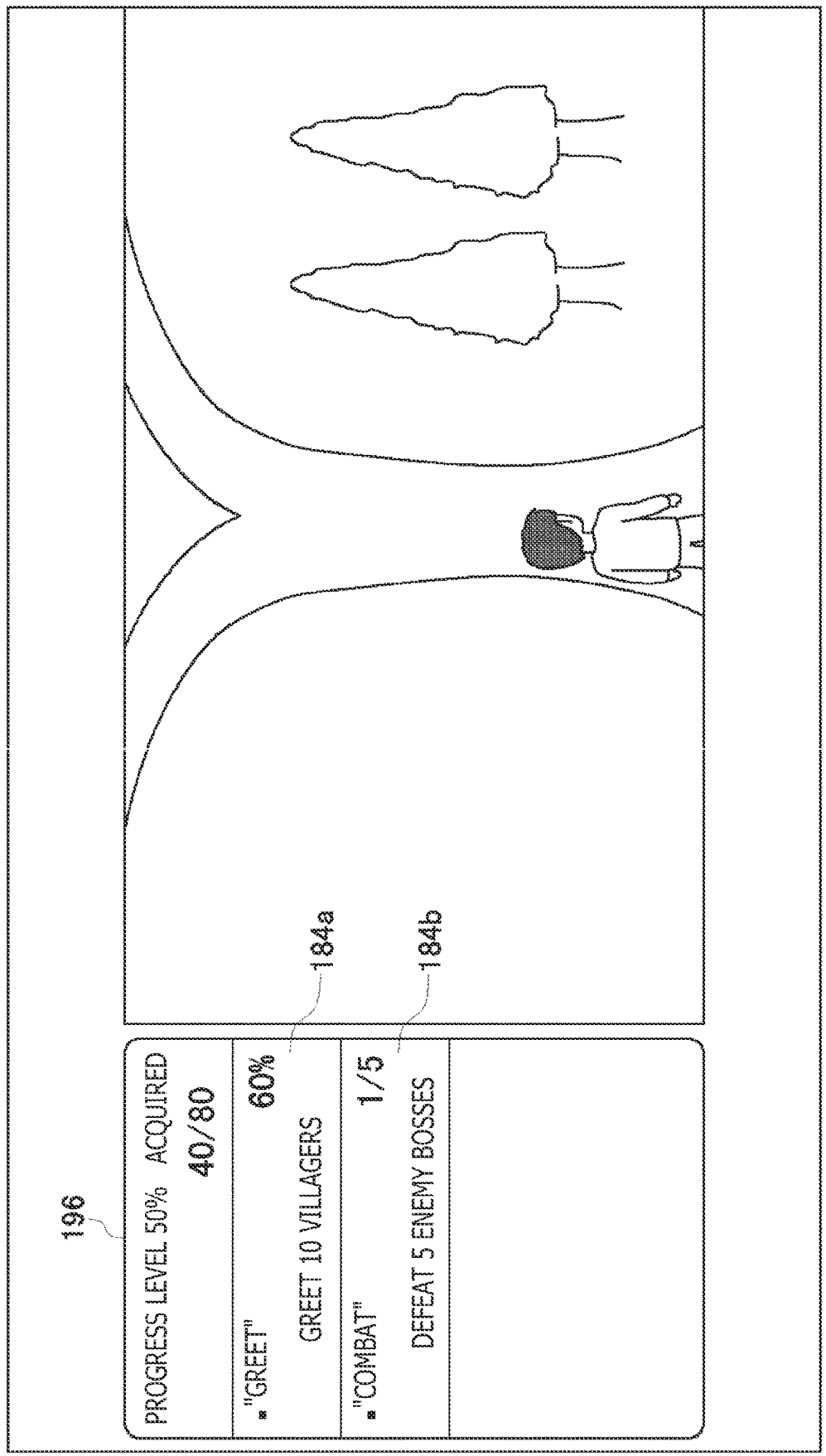
FIG. 12 illustrates an example in which a system image and a game image are displayed without being overlapped.

When a user presses and operates a simultaneous display button 194, the display processing unit 140 displays the trophy information 184a and 184b in a region that is separate from a region where the game screen is displayed. FIG. 12 illustrates an example in which a system image that includes trophy information and a game image are displayed without being overlapped. In this example, the display processing unit 140 disposes a system image 196 that includes the trophy information 184a and 184b on the left side of a game image which is subjected to reduced display. Note that the display processing unit 140 may dispose the system image 196 on the right side of the game image which is subjected to reduced display. Note that the display position of the system image 196 can be optionally changed by a user.

Figure 13:
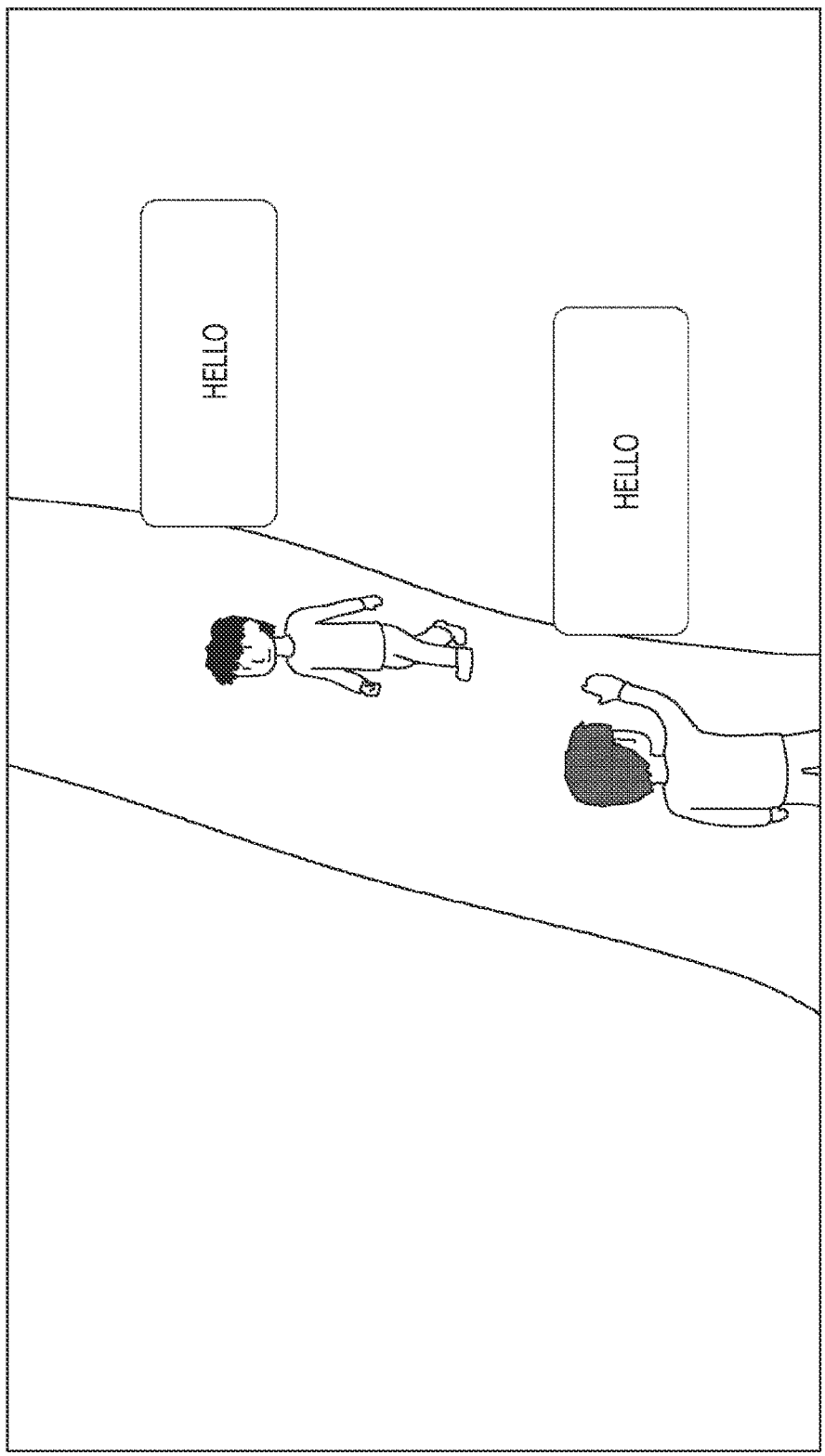
FIG. 13 illustrates an example of a game screen displayed by an output apparatus.

In the information processing system 1 according to the embodiment, the user operates the input device 6 to play a game. FIG. 13 illustrates an example of a game screen displayed by an output apparatus. In this game screen, a player character is greeting a villager. At this time, the game software 110 outputs an event code for a greeting command, and the event code obtainment unit 120 provides the event code for the greeting command to the trophy processing unit 124.

FIG. 14 illustrates an example of acquisition information overlappingly displayed on a game screen. Upon being provided with the event code for a greeting event, the trophy processing unit 124 refers to the configuration file and performs achievement determination processing for the unlock condition for the "greet" trophy. Here, the unlock condition is the game software 110 outputting a greeting event code ten times. When the output of the current event code is the tenth, the trophy processing unit 124 determines that the unlock condition has been achieved. The trophy processing unit 124 notifies information indicating acquisition of the "greet" trophy to the display processing unit 140, and the display processing unit 140 overlappingly displays acquisition information 198 for a predetermined amount of time (for example, five seconds) on the game screen.

In the server apparatus 5, the trophy processing unit 212 also determines that the unlock condition for the "greet" trophy has been achieved. The trophy processing unit 212 overwrites and updates the progress level for the "greet" trophy to 100% in the progress level recording unit 242, and also deletes, from the selected trophy recording unit 244, the trophy ID for the "greet" trophy which is recorded as a management target in the selected trophy recording unit 244. The information provision unit 220 provides the information processing apparatus 10 with information indicating that the "greet" trophy has been removed from management targets.

FIG. 15 illustrates an example of a system image relating to trophy management. The information obtainment unit 150 obtains, from the server apparatus 5, information relating to one or more trophies selected as management targets by a user. The display processing unit 140 displays the system image 176 relating to trophy management.

In this example, the system image 176 includes two items of trophy information 184a and 184b, but the trophy information 184b is displayed as information relating to a trophy that is being managed, and the trophy information 184a is displayed as information relating to an acquired trophy. In this manner, when a trophy selected as a management target by the user is acquired, this trophy is automatically removed from management targets, and the display processing unit 140 distinctively displays information relating to acquired trophies and information relating to trophies that have not been acquired. Note that one option is to delete, from the system image 176, information relating to a trophy that has been automatically removed from management targets. However, the display processing unit 140 displays information relating to an acquired trophy in a form that allows acquisition to be recognized, whereby a user can confirm that, by acquiring the "greet" trophy, this trophy is excluded from management targets. Note that, because the progress level information for achieving an unlock condition is unnecessary as information relating to an acquired trophy, the progress level information is not displayed in the trophy information 184a. In contrast, in relation to information indicating the unlock condition, because a user views this information to thereby be able to easily specify an acquired trophy information 184a, this information may be kept in the trophy information 184a.

Note that it is sufficient for the display processing unit 140 to temporarily display information relating to an acquired trophy in the system image 176, and there is no need to indefinitely display the system image 176. For example, when a game that is currently being played is reactivated again after being temporarily stopped, the display processing unit 140 may not display the trophy information 184a as information relating to acquired trophies in the system image 176.

The present disclosure is described above, based on an embodiment. A person skilled in the art would understand that this embodiment is an example, various variations are possible in combinations of respective components or processing processes in the embodiment, and such variations fall within the scope of the present disclosure.

As described in the embodiment, a user can select a trophy to set as a management target from the system image 172 (trophy image) illustrated in FIG. 7 or the system image 186 illustrated in FIG. 9. In a case where the user selects five trophies which are the upper limit number, on the system image 186 and thereafter presses and operates the management start button 174 on the system image 172, a total of six trophies will be selected. In this case, the trophy management unit 216 may remove the oldest selected trophy (the trophy that is selected first in the system image 186) from management targets and register the five mostly-recently selected trophies as management targets in the selected trophy recording unit 244.

In the embodiment, the display processing unit 140 uses information obtained by the information obtainment unit 150 from the server apparatus 5 to generate various system images, but, in a variation, the information obtainment unit 150 may obtain information generated in the processing unit 100 and the display processing unit 140 may generate various system images. For example, functionality of the selection information acceptance unit 214 and the trophy management unit 216 in the server apparatus 5 in the embodiment may be provided in the information processing apparatus 10, and the display processing unit 140 may generate system images on the basis of information relating to trophies which is generated by the trophy processing unit 124 and trophies managed by the trophy management unit 216.

What is claimed is:

1. An information processing apparatus comprising:
a memory comprising computer-executable instructions; and
a processor configured to access the memory and execute the computer-executable instructions to perform operations comprising:
rendering, based at least in part on an execution of a video game application, an image of a virtual space and a character maneuverable in the virtual space, wherein:
the execution of the video game application is associated with a plurality of virtual rewards; and
one or more virtual rewards of the plurality of virtual rewards are associated with completion of one or more unlock conditions;
identifying, based at least in part on a user input, a plurality of unlockable virtual rewards of the one or more virtual rewards, wherein each unlockable virtual reward of the plurality of unlockable virtual rewards is associated with an unlock condition of the one or more unlock conditions that has not been completed;
obtaining information related to the plurality of unlockable virtual rewards, wherein a portion of the information is obtained for an unlockable virtual reward of the plurality of unlockable virtual rewards;
generating a plurality of card-shaped images, wherein each card-shaped image of the plurality of card-shaped images is associated with a respective unlockable virtual reward of the plurality of unlockable virtual rewards and includes the portion of the information obtained for the respective unlockable virtual reward; and
overlaying one or more card-shaped images of the plurality of card-shaped images over at least a portion of the image on a display screen.

2. The information processing apparatus of claim 1, wherein the computer-executable instructions further comprise:
when the respective unlockable virtual reward is acquired, displaying second information relating to the respective unlockable virtual reward and third information relating to a second unlockable virtual reward of the plurality of unlockable virtual rewards that has not been acquired.

3. An information display method, comprising:
rendering, based at least in part on an execution of a video game application, an image of a virtual space and a character maneuverable in the virtual space, wherein:
the execution of the video game application is associated with a plurality of virtual rewards; and
one or more virtual rewards of the plurality of virtual rewards are associated with completion of one or more unlock conditions;
identifying, based at least in part on a user input, a plurality of unlockable virtual rewards the one or more virtual rewards, wherein each unlockable virtual reward of the plurality of unlockable virtual rewards is associated with an unlock condition of the one or more unlock conditions that has not been completed;
obtaining information related to the plurality of unlockable virtual rewards, wherein a portion of the information is obtained for an unlockable virtual reward of the plurality of unlockable virtual rewards;
generating a plurality of card-shaped images, wherein each card-shaped image of the plurality of card-shaped images is associated with a respective unlockable virtual reward of the plurality of unlockable virtual rewards and includes the portion of the information obtained for the respective unlockable virtual reward; and
overlaying one or more card-shaped images of the plurality of card-shaped images over at least a portion of the image on a display screen.

4. A non-transitory, computer readable storage medium containing a program, which when executed by a computer, causes the computer to carry out actions, comprising:
rendering, based at least in part on an execution of a video game application, an image of a virtual space and a character maneuverable in the virtual space, wherein:
the execution of the video game application is associated with a plurality of virtual rewards; and
one or more virtual rewards of the plurality of virtual rewards are associated with completion of one or more unlock conditions
identifying, based at least in part on a user input, a plurality of unlockable virtual rewards of the one or more virtual rewards, wherein each unlockable virtual reward of the plurality of unlockable virtual rewards is associated with an unlock condition of the one or more unlock conditions that has not been completed;
obtaining information related to the plurality of unlockable virtual rewards, wherein a portion of the information is obtained for an unlockable virtual reward of the plurality of unlockable virtual rewards;
generating a plurality of card-shaped images, wherein each card-shaped image of the plurality of card-shaped images is associated with a respective unlockable virtual reward of the plurality of unlockable virtual rewards and includes the portion of the information obtained for the respective unlockable virtual reward; and overlaying one or more card-shaped images of the plurality of card-shaped images over at least a portion of the image on a display screen.

5. The information processing apparatus of claim 1, wherein a first card-shaped image of the plurality of card-shaped images includes unlock information regarding a first unlock condition of the one or more unlock conditions associated with a first unlockable virtual reward of the plurality of unlockable virtual rewards.

6. The information processing apparatus of claim 5, wherein the computer-executable instructions further comprise generating, based at least in part on a second user input interacting with the first card-shaped image, a first system image including a first completion status of the first unlock condition.

7. The information processing apparatus of claim 6, wherein the computer-executable instructions further comprise generating, based at least in part on a third user input interacting with a second card-shaped image of the plurality of card-shaped images having a second unlock condition of the one or more unlock conditions associated with a second unlockable virtual reward of the plurality of unlockable virtual rewards, a second system image including a second completion status of the second unlock condition.

8. The information processing apparatus of claim 7, wherein the computer-executable instructions further comprise generating, based at least in part on a fourth user input interacting with the first system image and a fifth user input interacting with the second system image, a third system image including the first completion status and the second completion status.

9. The information display method of claim 3, wherein a first card-shaped image of the plurality of card-shaped images includes unlock information regarding a first unlock condition of the one or more unlock conditions associated with a first unlockable virtual reward of the plurality of unlockable virtual rewards.

10. The information display method of claim 9, further comprising generating, based at least in part on a second user input interacting with the first card-shaped image, a first system image including a first completion status of the first unlock condition.

11. The information display method of claim 10, further comprising generating, based at least in part on a third user input interacting with a second card-shaped image of the plurality of card-shaped images having a second unlock condition of the one or more unlock conditions associated with a second unlockable virtual reward of the plurality of unlockable virtual rewards, a second system image including a second completion status of the second unlock condition.

12. The information display method of claim 11, further comprising generating, based at least in part on a fourth user input interacting with the first system image and a fifth user input interacting with the second system image, a third system image including the first completion status and the second completion status.

13. The non-transitory, computer readable storage medium of claim 4, wherein a first card-shaped image of the plurality of card-shaped images includes unlock information regarding a first unlock condition of the one or more unlock conditions associated with a first unlockable virtual reward of the plurality of unlockable virtual rewards.

14. The non-transitory, computer readable storage medium of claim 13, wherein the program further comprises generating, based at least in part on a second user input interacting with the first card-shaped image, a first system image including a first completion status of the first unlock condition.

15. The non-transitory, computer readable storage medium of claim 14, wherein the program further comprises generating, based at least in part on a third user input interacting with a second card-shaped image of the plurality of card-shaped images having a second unlock condition of the one or more unlock conditions associated with a second unlockable virtual reward of the plurality of unlockable virtual rewards, a second system image including a second completion status of the second unlock condition.

16. The non-transitory, computer readable storage medium of claim 15, wherein the program further comprises generating, based at least in part on a fourth user input interacting with the first system image and a fifth user input interacting with the second system image, a third system image including the first completion status and the second completion status.

* * * * *